(12) United States Patent
Hessbrüggen et al.

(10) Patent No.: US 6,276,035 B1
(45) Date of Patent: Aug. 21, 2001

(54) TOOL-CHANGING DEVICE

(75) Inventors: Norbert Hessbrüggen, Eschenbach; Christoph Wernz, Stuttgart, both of (DE)

(73) Assignee: EMAG Maschinenfabrik GmbH, Salach (DE)

( * ) Notice: Subject to any disclaimer, the term of this patent is extended or adjusted under 35 U.S.C. 154(b) by 0 days.

(21) Appl. No.: 09/562,215

(22) Filed: Apr. 28, 2000

(30) Foreign Application Priority Data

Apr. 29, 1999 (DE) .............................. 199 19 553

(51) Int. Cl.[7] ................. B23Q 5/10; B23B 9/00
(52) U.S. Cl. ................. 29/40; 29/33 J; 29/39; 29/48.5 R; 408/35
(58) Field of Search ................. 29/39, 40, 41, 29/48.5 R, 48.5 A, 33 J; 483/54, 55, 30; 408/35; 91/43; 83/563; 74/813 C, 820; 82/121, 129

(56) References Cited

U.S. PATENT DOCUMENTS

| 4,223,579 | * | 9/1980 | Stark et al. ................. 408/35 X |
| 4,286,483 | * | 9/1981 | Henneberg et al. ................. 29/39 X |
| 4,920,303 | * | 4/1990 | Perdriat ................. 29/33 J |
| 5,341,722 | * | 8/1994 | Tani et al. ................. 91/43 |
| 5,758,399 | * | 6/1998 | Sahm et al. ................. 29/39 X |

FOREIGN PATENT DOCUMENTS

| 21 28 642 | | 12/1972 | (DE) . |
| 31 33 249 | | 3/1983 | (DE) . |
| 3213172 | * | 10/1983 | (DE) ................. 29/33 J |
| 39 29 136 C1 | | 1/1989 | (DE) . |
| 38 17 873 | | 11/1989 | (DE) . |
| 245749 | * | 5/1987 | (EP) ................. 29/33 J |
| 63-20130 | * | 1/1988 | (JP) ................. 29/33 J |

OTHER PUBLICATIONS

English Abstract of DE 2128642.
English Abstract of DE 3817873.
English Abstract of DE 3133249.
English Abstract of DE 3929136.

* cited by examiner

*Primary Examiner*—William Briggs
(74) *Attorney, Agent, or Firm*—Reed Smith LLP

(57) ABSTRACT

The tool-changing device comprises a tool carrier rotatably mounted in a basic housing by means of a hollow shaft. This tool carrier is driven via a ring motor, the rotor of which is directly connected to the hollow shaft. A servomotor for the drive of tools is provided in the interior of the hollow shaft. Furthermore, the cavity of the hollow shaft also accommodates supply lines for the tools.

13 Claims, 1 Drawing Sheet

TOOL-CHANGING DEVICE

BACKGROUND OF THE INVENTION a) Field of the Invention

The invention relates to a tool-changing device comprising a rotatably mounted tool carrier having at least two tools, which tool carrier can be swivelled into the respective working position for a tool by means of a swivel drive.

b) Description of the Related Art

DE-C-39 29 136 discloses a tool-changing device of this type.

Tool-changing devices of this type, which are also called tool turrets, have been known for a long time. Since such tool-changing devices have a large mass, in particular if they are prepared for a larger number of tools and possibly for driven tools, high torque is required at the swivel drive in order to swivel the tool-changing device from one working position into a further working position in which another tool is used. In order to amplify the effect of the motor, the use of a gear unit is therefore necessary in order to provide the requisite torque for a high rotary acceleration. On account of the high loading and the high operating frequency, mechanical gear units are subjected to high wear and in addition to that require a large amount of space. In addition, the feeding of drive energy to the driven tools and the feeding of coolants cause difficulties, since further space is required for this.

OBJECT AND SUMMARY OF THE INVENTION

The primary object of the invention is to design a tool-changing device in such a way that mechanical intermediate members, e.g. gear units, are dispensed with and the transmission of drive energy and other supply media to the tools is simplified with reduced space requirement.

In a tool-changing device of the type mentioned at the beginning, this object is achieved according to the invention in that the tool carrier is connected to a hollow shaft in a rotationally locked manner and is mounted such that it can be rotated by the latter, in that an electric ring motor, free from mechanical multiplication force-transmission elements, acts directly on the hollow shaft, and in that the hollow shaft has means for the drive and/or supply of the tools.

Ring motors of the type used here are synchronous motors having an electrical winding in the stator and many permanent magnets in the rotor. According to the invention, the rotor in this case is connected to a hollow shaft of very large diameter, as a result of which the ring motor, on account of its very large diameter required in this case, can exert very high torque on the hollow shaft, which is connected to the tool carrier in a rotationally locked manner and at the same time assumes the task of mounting the latter.

On account of the large inside diameter of the hollow shaft, means for the drive and/or supply of the tools can be accommodated without the need for additional space, as a result of which the previous, external arrangement of motors and transmission lines, which required considerable space, are unnecessary.

In order to be able to provide as large a cavity as possible in the hollow shaft for the drive means and/or other supply means on the one hand and yet keep the outside diameter of the tool-changing device small on the other hand, provision is made in a further design for at least part of the shell of the hollow shaft to be formed by the rotor of the ring motor. The hollow shaft is either interrupted, in which case at least part of the shell is formed by the rotor, so that the latter is not arranged on the hollow shaft but inside the shell of the hollow shaft. However, the hollow shaft as a whole may also form the rotor.

However, it also possible for the rotor of the ring motor to be arranged on the shell of the hollow shaft.

In tool-changing devices of the type mentioned at the beginning, the tool carrier is normally held in the corresponding working position by a brake or a lock, for example in the form of serrations.

According to the invention, provision is made for the tool carrier to be capable of being positioned by electrical activation of the ring motor. Due to the high torque which such a motor can produce, it is not only possible to swivel the tool carrier quickly from one position into the other but also to hold it in a certain position without brakes and other mechanical locks.

A further advantageous design of the invention consists in the fact that the tool carrier is designed as an annular body, that the tools are arranged in the annular body, that a force-transmission device which can be coupled to the tools is arranged in the cavity enclosed by the annular body, and that the force-transmission device is connected to the means, arranged in the hollow shaft, for the drive of the tools. This results in an extremely compact and space-saving arrangement of the force-transmission device, which in view of its space requirement does not appear on the outside, since it is provided inside the cavity enclosed by the annular body of the tool carrier.

The means for the drive of the tools is advantageously a servomotor.

An advantageous design which advantageously develops the basic idea behind the invention may be seen in the fact that the force-transmission device is designed as an angle drive which has a central shaft which runs radially through the center of the cavity enclosed by the annular body, is mounted in a bearing cage supported such that it can be rotated relative to the hollow shaft and carries a bevel gear at its one end, this bevel gear meshing with a bevel gear driven by the servomotor, and carries a coupling at its other end, this coupling serving to connect the drivable central shaft to each drivable tool of the tool carrier. This angle drive is located in the center of the annular tool carrier. On account of its rotatable support relative to the hollow shaft, it is always in the state of rest, so that this angle drive does not constitute any increase in the tool-carrier mass to be accelerated.

A means for the supply of the tools may be at least one line for feeding coolant and/or energy. The line for the supply of tools may be arranged in the shell of the servomotor for the tool drive or in the shaft of the servomotor for the tool drive. However, it is also possible for the line for the supply of tools to be arranged between the shell of the servomotor and the hollow shaft.

The invention is explained in more detail below with reference to an exemplary embodiment.

BRIEF DESCRIPTION OF THE DRAWING

The single drawing shows a section through a tool-changing device.

DESCRIPTION OF THE PREFERRED EMBODIMENTS

Figure 1:
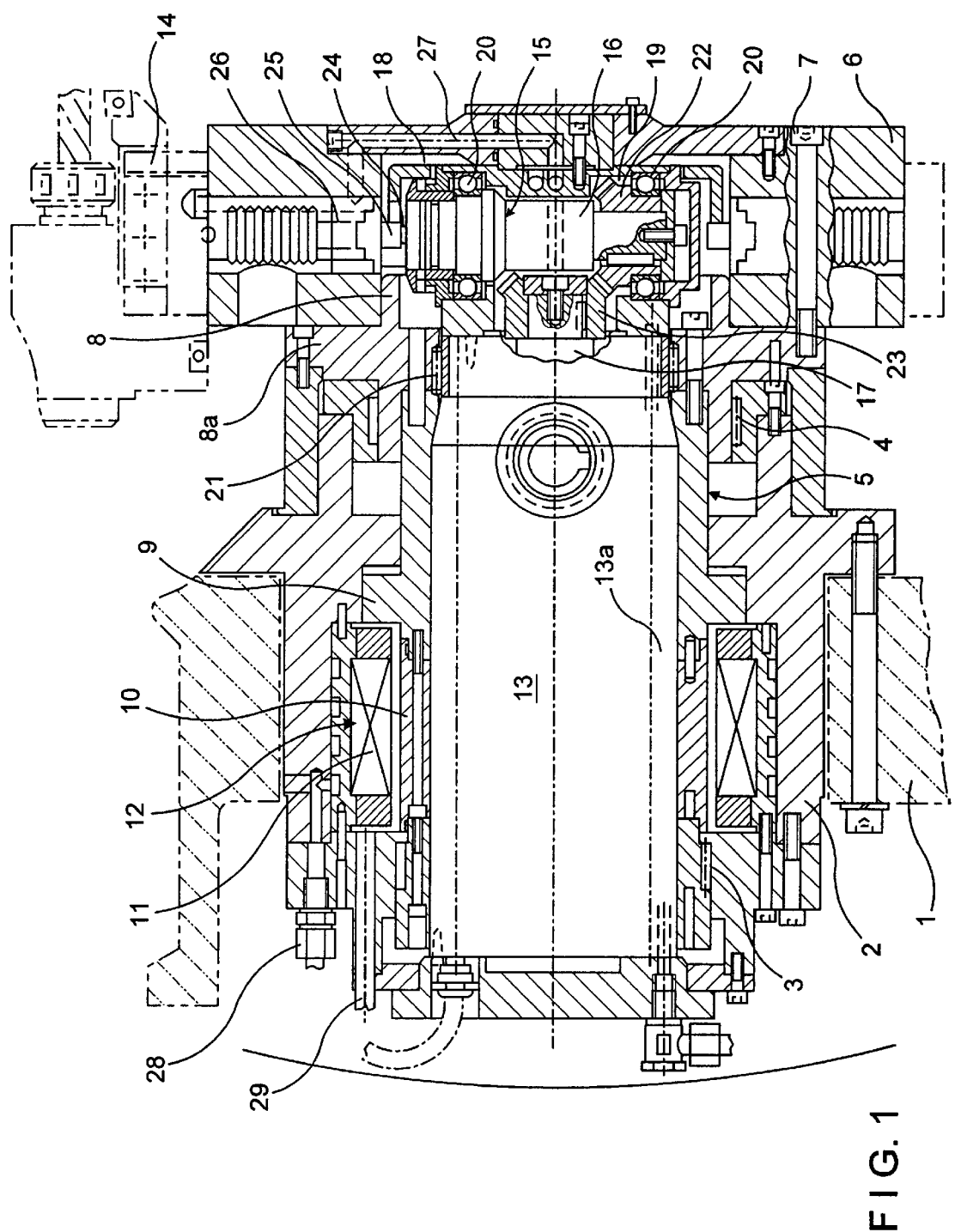

A housing shell 2 is arranged in a basic housing 1 (only intimated) of a tool-changing device which can be arranged in a fixed position on the machine or arranged on a slide, and this housing shell 2 serves for providing bearings 3, 4 for mounting a hollow shaft designated overall by 5, a tool carrier 6 being fastened to the right-hand end (in the drawing) of this hollow shaft 5 by means of screws 7. The tool carrier 6 is designed as an annular body and is centered on a collar 8 of a flange body 8a, which is attached to a cylindrical part 9 of the hollow shaft 5, designated as a whole, and therefore forms part of the hollow shaft 5. The cylindrical part 9 of the hollow shaft 5 is interrupted approximately in the center and replaced by a rotor 10, which is composed of individual magnets and is surrounded by a stator 12, which has electrical windings 11 and is firmly connected to the housing shell 2. This stator 12 together with the rotor 10 forms a ring motor having high torque. In this case, the stator is designed in its internal diameter in such a way that it is in alignment with the inner wall of the cylindrical part 9 of the hollow shaft 5. When the windings of the stator 12 are excited, the rotor 10 and thus the hollow shaft 5 are driven. Since this hollow shaft 5 is connected to the tool carrier 6 in a rotationally locked manner, the latter is also swivelled by the rotary movement of the hollow shaft 5.

The interior space of the hollow shaft 5 serves to accommodate a servomotor 13, which is intended for driving a tool 14, which is indicated by chain-dotted lines and sits on the outer circumference of the annular tool carrier 6. An angle drive, designated overall by 15, serves to transmit the force from the servomotor 13 to the driven tool 14, this angle drive having a central shaft 16, which runs in the radial direction perpendicularly to the axis of the drive shaft 17 of the servomotor 13 through the center of the cavity 18 enclosed by the annular tool carrier 6. This central shaft 16 is mounted by means of ball bearings 20 in a housing 19, which is supported via rolling-contact bearings 21 relative to the flange body 8a, which forms part of the hollow shaft 5. Arranged on the bottom end (in the drawing) of the central shaft 16 is a bevel gear 22, which meshes with a bevel gear 23 sitting on the drive shaft 17. On the end opposite the bevel gear 22, the central shaft carries a coupling 24, which can be coupled with a correspondingly designed end piece 25 of a tool shank 26 in the respective indexing position of the tool carrier 6.

A supply line which reaches up to the tool 14 and is passed through the shell 13a of the servomotor 13 and the housing 19 is designated by 27.

A coolant line 28 serves to feed coolant for the stator 12 of the ring motor. The electrical power is fed via a cable 29.

While the foregoing description and drawings represent the preferred embodiments of the present invention, it will be obvious to those skilled in the art that various changes and modifications may be made therein without departing from the true spirit and scope of the present invention.

What is claimed is:

1. A tool-changing device comprising:
   a rotatably mounted tool carrier having at least two tools which can be swiveled into a respective working position for a tool;
   an electric swivel drive for swiveling said tool carrier into a respective working position for a tool;
   said tool carrier being connected to a hollow shaft in a rotationally locked manner and being mounted such that it can be rotated by said shaft;
   wherein said swivel drive is an electric ring motor, free from mechanical multiplication force-transmission elements, acting directly on the hollow shaft; and
   said hollow shaft receiving at least one part for driving or at least one part for supplying said at least two tools.

2. The tool-changing device according to claim 1, wherein at least part of the shell of the hollow shaft is formed by said rotor of the ring motor.

3. The tool-changing device according to claim 1, wherein the rotor of the ring motor is arranged on the shell of the hollow shaft.

4. The tool-changing device according to claim 1, wherein the tool carrier can be positioned by electrical activation of the ring motor.

5. The tool-changing device according to claim 1, wherein the tool carrier is designed as an annular body, wherein the tools are arranged in the annular body, wherein a force-transmission device which can be coupled to the tools is arranged in the cavity enclosed by the annular body, and wherein the force-transmission device is connected to the means, arranged in the hollow shaft, for the drive of the tools.

6. The tool-changing device according to claim 1, wherein the means for the drive of the tools is a servomotor.

7. The tool-changing device according to claim 5, wherein the force-transmission device is designed as an angle drive which has a central shaft which runs radially through the center of the cavity enclosed by the annular body, is mounted in a bearing cage supported such that it can be rotated relative to the hollow shaft and carries a bevel gear at its one end, this bevel gear meshing with a bevel gear driven by the servomotor, and carries a coupling at its other end, this coupling serving to connect the drivable central shaft to each drivable tool of the tool carrier.

8. The tool-changing device according to claim 1, wherein a means for the supply of the tools is at least one line for feeding coolant.

9. The tool-changing device according to claim 8, wherein the line for the supply of tools is arranged in the shell of a servomotor for the tool drive.

10. The tool-changing device according to claim 8, wherein the line for the supply of tools is arranged in the shaft of a servomotor for the tool drive.

11. The tool-changing device according to claim 8, wherein the line for the supply of tools is arranged between the shell of a servomotor and the hollow shaft.

12. A tool-changing device comprising:
   a rotatably mounted tool carrier having at least two tools;
   a swivel drive for swiveling said tool carrier into a respective working position for a tool;
   said tool carrier being connected to a hollow shaft in a rotationally locked manner and being mounted such that it can be rotated by said shaft;
   an electric ring motor, free from mechanical multiplication force-transmission elements, acting directly on the hollow shaft;
   said hollow shaft having means for the drive or for supply of the tools; and
   wherein the tool carrier is designed as an annular body, wherein the tools are arranged in the annular body, wherein a force-transmission device which can be coupled to the tools is arranged in the cavity enclosed by the annular body, and wherein the force-transmission device is connected to the means, arranged in the hollow shaft, for the drive of the tools.

13. The tool-changing device according to claim 12, wherein the force-transmission device is designed as an angle drive which has a central shaft which runs radially through the center of the cavity enclosed by the annular body, is mounted in a bearing cage supported such that it can be rotated relative to the hollow shaft and carries a bevel gear at its one end, this bevel gear meshing with a bevel gear driven by the servomotor, and carries a coupling at its other end, this coupling serving to connect the drivable central shaft to each drivable tool of the tool carrier.

\* \* \* \* \*